(12) United States Patent
Zingaretti et al.

(10) Patent No.: US 9,202,312 B1
(45) Date of Patent: Dec. 1, 2015

(54) HAIR SIMULATION METHOD

(71) Applicant: Restoration Robotics, Inc., San Jose, CA (US)

(72) Inventors: Gabriele Zingaretti, Capitola, CA (US); Hui Zhang, San Jose, CA (US)

(73) Assignee: Restoration Robotics, Inc., San Jose, CA (US)

( * ) Notice: Subject to any disclaimer, the term of this patent is extended or adjusted under 35 U.S.C. 154(b) by 0 days.

(21) Appl. No.: 14/335,157

(22) Filed: Jul. 18, 2014

(51) Int. Cl.
*G06K 9/00* (2006.01)
*G06T 19/00* (2011.01)
*A45D 44/00* (2006.01)
*A61B 17/50* (2006.01)

(52) U.S. Cl.
CPC .............. *G06T 19/00* (2013.01); *A45D 44/005* (2013.01); *G06T 19/006* (2013.01)

(58) Field of Classification Search
CPC ................................. A61B 5/00; G06T 19/00
USPC ........ 382/154, 285; 703/3, 6, 13, 14; 606/133
See application file for complete search history.

(56) References Cited

U.S. PATENT DOCUMENTS

| | | | |
|---|---|---|---|
| 5,404,426 A | 4/1995 | Usami et al. | |
| 5,758,046 A | 5/1998 | Rouet et al. | |
| 5,764,233 A | 6/1998 | Brinsmead et al. | |
| 5,777,619 A | 7/1998 | Brinsmead | |
| 6,585,746 B2 | 7/2003 | Gildenberg | |
| 6,940,508 B2 | 9/2005 | Lengyel | |
| 6,985,611 B2 | 1/2006 | Loussouarn et al. | |
| 7,450,122 B2 | 11/2008 | Petrovic et al. | |
| 7,468,730 B2 | 12/2008 | Petrovic et al. | |
| 7,806,121 B2 | 10/2010 | Bodduluri | |
| 8,055,011 B2 | 11/2011 | Ikeda et al. | |
| 8,743,124 B2* | 6/2014 | Audoly | G06T 13/40 345/473 |
| 2003/0063794 A1 | 4/2003 | Rubinstenn et al. | |
| 2007/0106306 A1 | 5/2007 | Bodduluri et al. | |
| 2014/0261467 A1 | 9/2014 | Zhang et al. | |
| 2014/0278321 A1 | 9/2014 | Zhang et al. | |

FOREIGN PATENT DOCUMENTS

WO 98/21695 5/1998

OTHER PUBLICATIONS

Bando, et al., "Animating Hair with Loosely Connected Particles", Eurographics 2003, vol. 22, No. 3, 2003, 8 pages.
Dzung, "Realistic Hair Visualization in Maya: A new work-flows and methods", BA Computer Visualization & Animation Innovations in Computer Animation Report. University of Bournemouth NCCA, 2010, 42 pages.
Iben, et al., "Artistic Simulation of Curly Hair", Pixar Animation Studios. Pixar Technical Memo #212-03a, 9 pages.

(Continued)

*Primary Examiner* — Abolfazl Tabatabai
(74) *Attorney, Agent, or Firm* — Sharon Upham; Lena I. Vinitskaya

(57) ABSTRACT

Methods and systems are provided for generating/simulating hair on a 3D model taking into consideration some information from an image of a person, such as for example, the stage of hair loss, to determine which methodology or algorithm to use to generate the hair. The methods and systems of the present application are especially useful in those applications where it is desirable to display the existing hair together with newly simulated hair.

29 Claims, 7 Drawing Sheets

(56) References Cited

OTHER PUBLICATIONS

Kajiya, et al., "Rendering Fur with Three Dimensional Textures", Computer Graphics, vol. 23, No. 3, Jul. 1989, 271-280.

Petrovic, et al., "Volumetric Methods for Simulation and Rendering of Hair", Pixar Animation Studios. Pixar Technical Memo #06-08, 6 pages.

* cited by examiner

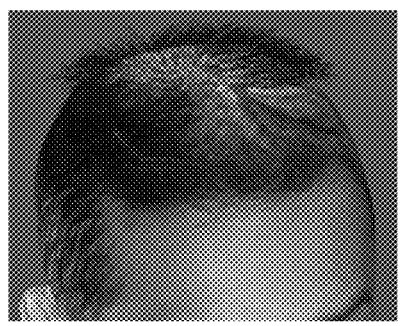
Fig 1
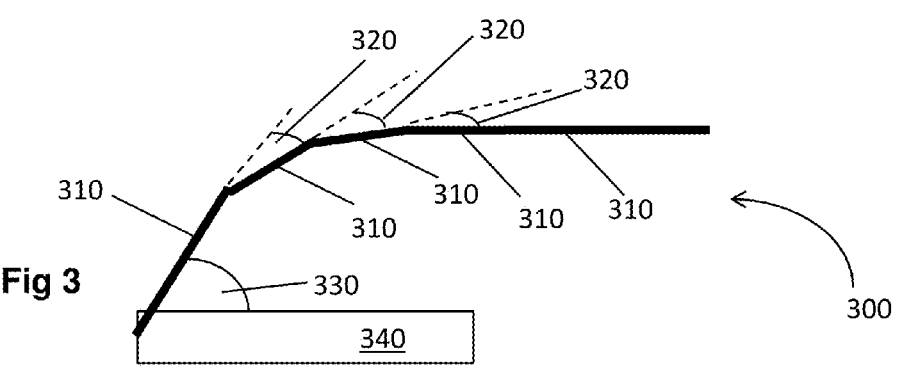
Fig 3
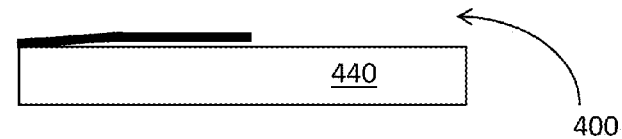
Fig 4
Fig 5a    Fig 5b 

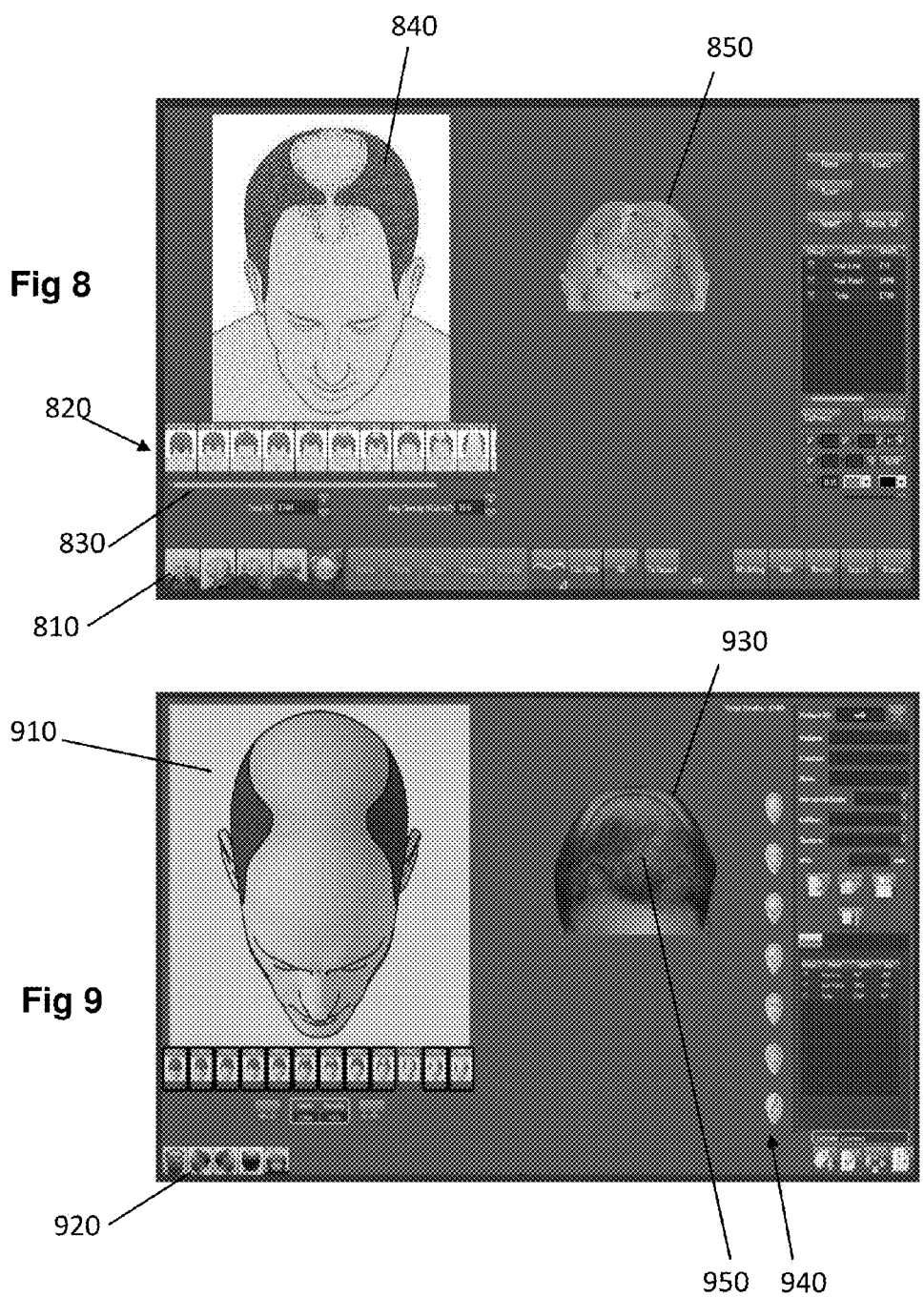

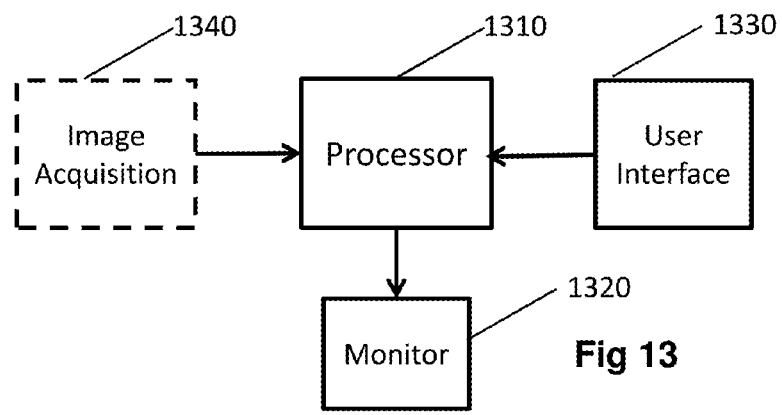
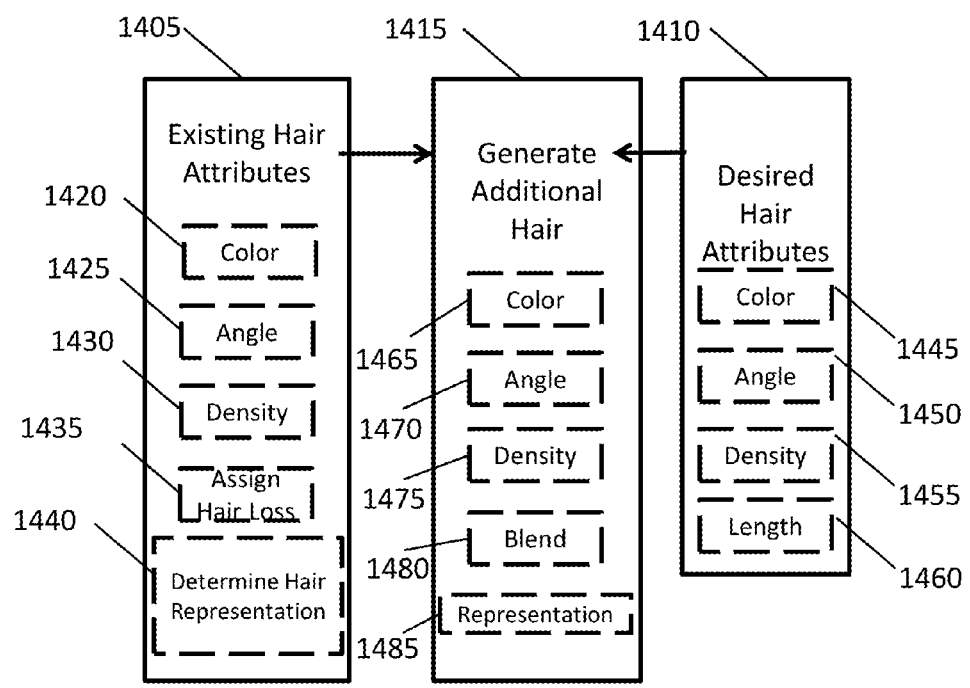

HAIR SIMULATION METHOD

FIELD OF THE APPLICATION

This application relates generally to hair simulation methods and systems. In particular, this application relates to the simulation of appearance of the implanted or new hair grafts, for example, to show or predict results of the cosmetic hair restoration.

BACKGROUND OF THE APPLICATION

When planning a medical procedure, for example a hair transplantation procedure, it is beneficial for both the patient and the physician if a realistic simulation of the outcome of the hair procedure can be provided.

Various approaches have been proposed for hair and fur modeling for virtual characters in video games, movies and animations. However, such approaches and techniques are labor intensive, time consuming and not suitable in other applications, such as hair simulation for medical purposes and other applications. On the other hand, in such medical applications, the options available for patients to see a realistic representation of what he/she may look like once they have a procedure performed, are somewhat limited, particularly in terms of medical treatments and procedures, including those related to hair restoration. Using hair restoration as an example, no matter what type of hair restoration process or hair transplant procedure is adopted, whether it is a chemical or drug application or treatment, or if it is a surgical hair transplantation, such as a strip procedure, a manual follicular unit extraction (FUE) procedure or robotic FUE process, it would aid both the physician and the patient if the patient could be provided with a realistic representation of their post-procedure or post-treatment appearance. Simulations of what a patient would look like after a product has been applied or procedure has been performed would not only assist the physician in explaining to their patients what the procedure could offer them and what their "new" head of hair would look like, but would also help the patient decide if the procedure is the right one for them. Therefore, there is a need for continued improvements in hair modeling and simulation methods and systems, especially those useful for hair simulation and rendering in planning medical and cosmetic treatments and procedures.

SUMMARY

A variety of systems and methods for planning various cosmetic and dermatological treatments and procedures, including hair transplantation, are provided in the present application. These procedures and treatments may be performed on the scalp, face and other skin and body surfaces.

According to one aspect of the present application, a method of simulating hair on a 3D model of a head is provided, the method comprising: assigning a stage of hair loss to a 3D model of a head comprising hair; and simulating one or more additional hair on the 3D model based on the assigned stage of hair loss, wherein, if the assigned stage of hair loss is below a threshold value, the one or more additional hair is simulated using a first approach of hair representation, and if the assigned stage of hair loss is at or above the threshold value, the one or more additional hair is simulated using a second approach of hair representation. In certain embodiments, the first approach comprises simulating a projected hair and the second approach comprises simulating a volumetric hair. Assigning a stage of hair loss may comprise assigning a Norwood scale value, a Ludwig and Savin scale of hair loss, or may be based on the existence of a receding hair line, a bald spot and its size, or both, and/or whether a receding hair line and a bald spot meet. The method may further comprise blending the simulated one or more additional hairs with the 3D model. The simulated one or more additional hair may be matched with a natural hair color of the 3D model.

In another aspect of the present application, a method of simulating hair on a 3D model is provided, the method comprising: using one or more images of a person's head comprising existing hair to create a 3D model of the person's head; determining from the one or more images or from the simulated 3D model a corresponding stage of hair loss; and simulating one or more additional hair on the 3D model based on the determined stage of hair loss, wherein the additional hair is depicted by a first representation if the stage of hair loss is below a threshold value, and the additional hair is depicted by a second representation if the stage of hair loss is at or above the threshold value. The number of 2D images used to create the 3D model may comprise, for example, two to five images. Each of the 2D images may be used to morph a 3D model, and a plurality of 3D models may be used to create a final 3D model. Determination of the corresponding stage of hair loss may be manually input or selected, or be determined automatically.

In some embodiments, the additional hair may comprise a plurality of hair segments, each segment placed end to end and at an angle to an adjacent segment. The number of segments may be varied to achieve a predetermined length of additional simulated hair. The angle between adjacent segments may be varied to vary the tightness of the curl.

In yet another aspect of the present application, a system for simulating hair on a 3D model of a head is provided, the system comprising: a user interface including a user input device; at least one non-transitory storage medium storing instructions, and one or more modules for executing operations on image data, the one or more modules comprising instructions for: assigning a stage of hair loss to a 3D model; and simulating one or more additional hairs on the 3D model based on the assigned stage of hair loss, wherein, if the assigned stage of hair loss is below a threshold value, the one or more additional hair is simulated using a first approach of hair representation, and if the assigned stage of hair loss is at or above the threshold value, the one or more additional hair is simulated using a second approach of hair representation. The system may further comprise an image acquisition device.

In some embodiments, the one or more modules may comprise instructions for assigning a stage of hair loss, determining one or more of an angle, density, length or color, or executing a color match or a blending operation.

In a yet further aspect of the current application, a method of simulating hair on a 3D model of a head is provided, the method comprising: assigning a stage of hair loss to a 3D model of a head comprising hair; and simulating one or more additional hair on the 3D model based on the assigned stage of hair loss, wherein, if the assigned stage of hair loss is below a threshold value, the one or more additional hair is simulated using a projected hair representation approach, and if the assigned stage of hair loss is at or above the threshold value, the one or more additional hair is simulated using a volumetric hair representation approach. The method may further comprise blending the simulated one or more additional hairs with the 3D model. The simulated one or more additional hair may be matched with a natural hair color of the 3D model.

Other and further objects and advantages of the invention will become apparent from the following detailed description when read in view of the accompanying figures. Details of one or more implementations of the subject matter described in this specification are set forth in the accompanying drawings and the description below.

BRIEF DESCRIPTION OF THE DRAWINGS

Features and advantages of the embodiments described herein will become appreciated as the same become better understood with reference to the specification, claims, and appended drawings wherein:

FIG. 1 illustrates deficiencies of the existing methods of simulating hair in those applications where it is desirable to also accurately depict the existing hair on 3-D models.

FIG. 3 depicts an example of a segmented hair, according to one volumetric approach.

FIG. 4 depicts an example of a segmented hair that has been projected.

FIGS. 5a and 5b depict an example of the effect of blending.

FIGS. 8 and 9 illustrate examples of a user interface which may be used to implement a methodology of the present application.

FIG. 13 illustrates an example of the elements of a system for implementing the methods of the present application.

FIG. 14 illustrates an example of the modules in the processing unit that could be used for implementing the methods of the present application.

DETAILED DESCRIPTION OF THE PREFERRED EMBODIMENTS

Figure 2:
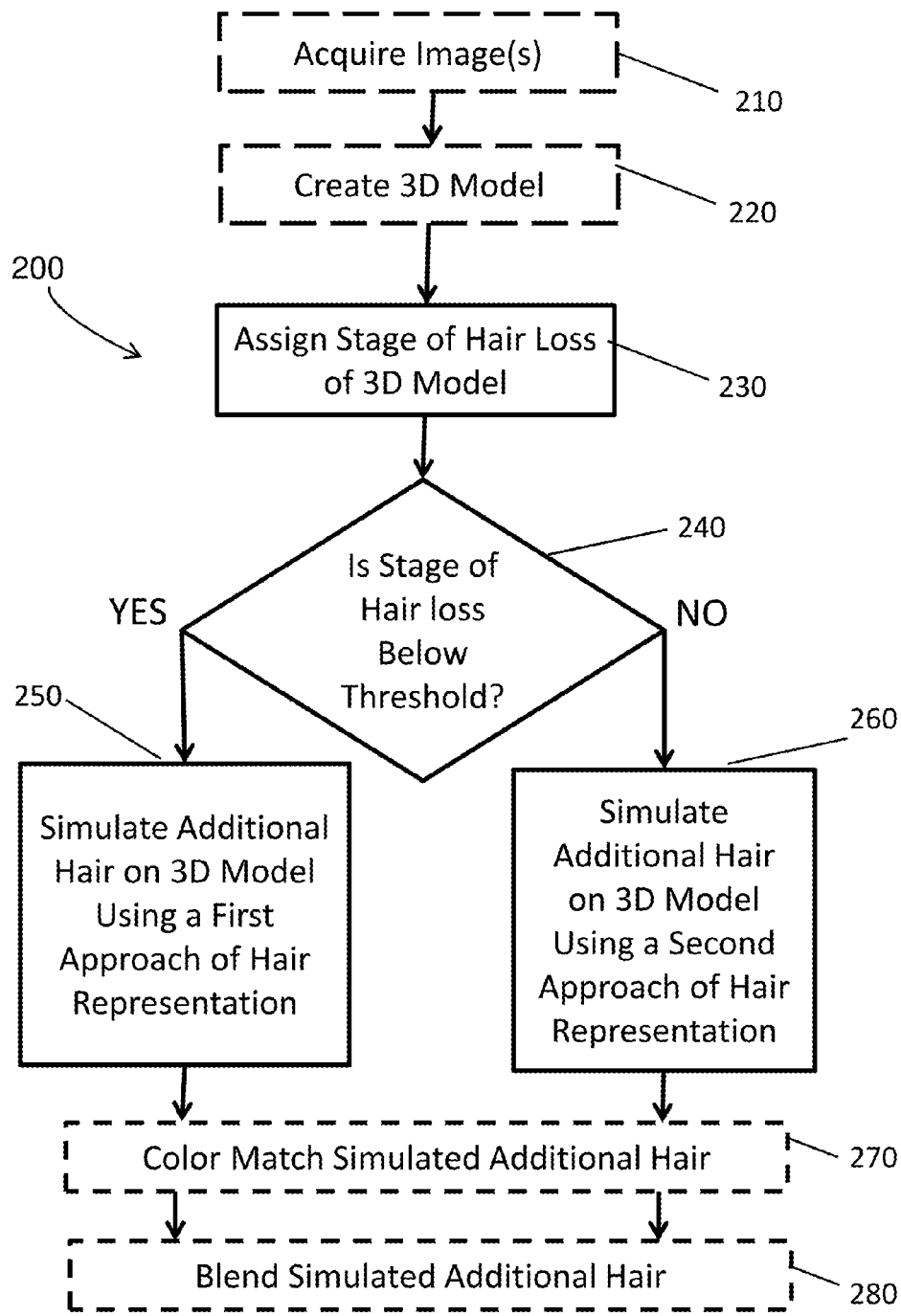
FIG. 2 is a flow chart illustrating an example of a general method for generating simulated hair on a 3D model according to the present application.

In the following Detailed Description reference is made to the accompanying drawings that show by way of illustration specific embodiments in which the application may be practiced. It is to be understood that other embodiments and examples may be utilized and structural or logical changes may be made without departing from the scope of the present application. Also, various features and elements that may be discussed in reference to particular embodiments may be combined together in other embodiments. It should be noted that although the application is particularly useful in medical and/or cosmetic applications, such as for planning hair harvesting, hair implantation or other hair restoration treatments, it is not limited to use for hair transplantation and hair restoration. The application may also be beneficial to other procedures and applications that require a model of the patient's body surface and parts containing hair, for example, various cosmetic and dermatological procedures involving treatment planning may benefit from the systems and methods described herein. One example of applicability of the application is in medical, cosmetic, plastic-reconstruction or dermatological procedures on a chest, face or other body parts. Another example is any non-medical and non-cosmetic application where it is desired to simulate an accurate representation of the appearance of a person with at least a portion of the hair simulated and where representation of the moving subject (and hair) is not of importance but efficient processing time is desirable. For convenience of description, the following description will be discussed by example in reference to hair transplantation procedures. It should be noted, however, that such description is for the purposes of illustration and example only and is not intended to be exhaustive or limiting.

In the field of hair transplantation, patients have rather limited options available to them in terms of getting an idea of what they might look like if they have a hair transplantation procedure performed. One option is to look at the before and after photos of other people, and to guess what the outcome of their procedure might look like on them. Another option is to superimpose a wig or virtual hair style on an image of themselves. No matter which option is selected, the results do not allow for a realistic representation to be obtained. For example, the people depicted in photographs may not have a forehead, head shape, hair type or hair quality similar to that of the patient. Further, the superimposition of a wig may not be positioned or located on their image in such a way that the wig looks natural, and the color, texture or curl options may not accurately reflect their natural hair color, texture or tightness/looseness of curls. Moreover, the final outcome of each individual patient has the additional complication that the number, location and positioning of each individual hair has to be considered when giving the patient an idea of what he/she might look like. In addition, the available solutions to this problem do not allow the patient to see what his/her hair transplantation looks like from different angles, allowing them to know how people see them from behind or from the side, for example.

A system and methodology that allows one to obtain a representation in the form of a realistic visual image of what they would look like after a treatment has been completed or a procedure has been performed is desirable. It would be also desirable that such system and methodology enable patients and physicians to view a realistic representation from a plurality of angles, and additionally, allow such a realistic visual representation to be obtained quickly, efficiently and without encountering significant cost.

Attempts of generating realistic hair on an image has been conducted for years, particularly with the increased use of virtual or simulated images in the movie and video game industries. In the movie industry, vast sums of money are spent in simulating images that are realistic in appearance to ensure that to the user the simulations cannot be differentiated from the actual real images. Entire movies are created in which the animated characters are simulated, yet to the viewer it is difficult to tell if the character is a live person or merely a simulation created for their entertainment. Similarly, the video game industry expends a substantial amount of processing time to create realistic life-like images. In both these industries high resolution and quality is required, as well as ability to control and represent the extreme motions of characters and their hair, and complex processing necessary to ensure that, for example, hair on a person/animal moves along with the simulated person/animal, and that the shape formed by a mass of hair (including the movement of hair) forms a particular contour, for example. In such applications, typically the visual appearance of the hair as a whole supersedes the single hairs on a head of a person. In the gaming industry, the fact that the user can control the movement of his character, the camera angle, and a host of other features that have typically been restricted by the system, has led to the need for both an increase in processing power and speed, which although has improved the quality of the images in such applications, comes at a financial cost. Additionally, these industries typically invest a significant amount of time into pre- and post-processing.

Turning to medical procedures and treatments, hair transplantation in particular, generating a 3D model and simulating both existing and new implanted hair presents a unique set of requirements different from the parameters found in the video gaming and movie industries. Typically in the creation of movies, animated characters and gaming creatures or persons, the character, creature or person is created "bald" or hairless, and the hair or fur is then created to simulate natural hair or fur in that environment. In the hair restoration field, the patient typically has some or a substantial amount of existing hair, and a hair transplantation procedure relocates existing hair to other locations on the scalp or body. In the generation of a 3D model of the head of the hair transplant patient, unlike in the movie or video game industry, it would defeat the purpose to remove from the model all the existing hair before simulating the implanted hair. A patient of a hair transplantation procedure specifically wants to know what the implanted hair will look like and how it will blend with his/her existing hair. Furthermore, for the purposes of visualizing results of the medical treatments, such as hair restoration treatment, there is no need to account for any extreme hair movement with the model and the environment. Consequently, the existing techniques and approaches that are currently used for purposes of modeling hair in video games and movie animations do not provide adequate solutions for the purposes of simulating appearance of hair to demonstrate potential results of medical treatment and other similar applications.

FIG. 1 illustrates the deficiencies of the existing methods of generating hair on a 3D model as currently used in games, videos and movies when such existing methods are applied to those applications in which it is important to correctly depict the existing hair in addition to generating new hair, for example, for use in the hair restoration, including hair transplantation field. With reference to FIG. 1, a patient who has early stages of hair loss is illustrated, the patient having a substantial amount of hair in addition to a balding area. The simulation of additional hair (such as the proposed implanted hair grafts) has been illustrated using one of the existing "volumetric hair representation" approaches, such as those used in video games and/or animations. Typically, when using such an approach, the person's existing hair is first removed from the model and all simulated hair is rendered on the bald model. However, if the existing hair is not removed, it can be seen that the new hair, which is simulated only in the actual bald area, does not match and does not naturally and smoothly blend with the pre-existing hair. As illustrated, this produces an almost comic appearance: the Mohican-like hair style created by the additional or newly simulated hair does not match the existing hair of the patient, and does not give a true or realistic impression of what a person might look like if he or she were to have hair implanted in that region of the scalp (or other body surface) head.

The current application solves the problem described above and provides a method for generating additional or new hair on a 3D model, using parameters or information from an image of the person or the patient, such as the stage of hair loss, to determine which algorithm to use to generate such new/additional hair. The information that may be used to determine the stage of hair loss may comprise, for example, a quantity and/or quality of the follicular units, a size, dimensions and other information about the area of body surfaces such as the scalp, hair density and the variation of density throughout different regions of the body surface, such as patient's scalp, the manner in which a person styles and/or combs his/her hair, age, sex, health or other such parameters, or any combination of one or more of the above-mentioned and other parameters.

Utilization of the methodology of the current application enables, for example, a physician to obtain a realistic image of what his/her patient looks like at the current time, and what he/she may look like at various stages during, as well as after a hair transplantation procedure is completed, based upon an image of their head, and their actual hair. Utilization of various aspects of the current application provides not only a realistic image of what the newly implanted hair may look like, but of what the areas from which the donated hair will look like once the hair has been harvested from the donor regions(s). In this manner a person is able to see what he/she may look like as a result of undergoing hair transplantation or other hair restoration treatment, which reduces the chances of a patient misunderstanding or unrealistic expectations. Additionally, the methodology and devices of this application provide the physician with a tool to enable him or her to ensure that there is, for example, sufficient hair in the donor regions, to provide the look that the patient is hoping for. If there is not, the current application provides the physician with a tool to enable him/her to illustrate to the patient what possible hair transplantation options are available to him or her based on the hair they have available in the donor regions.

FIG. 2 is a flow chart illustrating one example of a general methodology 200 for determining how one or more additional or new hairs (or hair grafts) are simulated according to the present disclosure, for example, for use in the planning of a medical or cosmetic procedure, such as a hair transplantation procedure. Although the method 200 is illustrated and described as including specific operations performed in a specific order, it is understood that this is for purposes of example only. In various implementations, some operations may be performed in another order without departing from the scope of the present disclosure. In other implementations, only a subset of the various operations may be required, again without departing from the scope of the present application. The methodology may be implemented, for example, by use of a computer program, or modules having a sequence of instructions written to be executed to perform specified tasks with the aid of a computer. In order for the methodology 200 to be applied, in step 230, the current stage or level of hair loss associated with a person, such as a patient, is assigned. In one embodiment the stage of hair loss can be provided directly by the user through or by means of a user interface comprising a user input device, such as a keyboard, mouse, stylus or a touch screen on which one may use one's fingers or gestures, for example. Other methods of assigning the hair loss stage are also within the scope of the present applications, some examples of which will be described below.

The stage or level of hair loss can be represented in a variety of ways. One possibility is by using scales generally used in the hair transplantation industry, such as the Hamilton-Norwood scale for male patterned baldness (conventionally referred to as the Norwood scale), or the Ludwig and Savin scale for female patterned baldness (conventionally referred to as the Ludwig scale). Another possibility is to determine the stage of hair loss based on the existence of a receding hairline, a bald spot, the size of the bald spot, or whether a receding hair line and a bald spot meet, or combinations of any of the above. As another example, the current stage of hair loss can be determined from one or more images, and/or a 3D model of the patient, for example, based on a percentage or ratio of an area or portion with hair relative to the hairless of bald portion. As another example, the level of hair loss may be determined using various equipment and tools, for example, based on the results obtained using a digital microscope, such as that manufactured by ProScope, which can determine the number of terminal and/or non-terminal hairs in a region.

As indicated above, step 230 may be implemented in a number of ways. While it may be inputted by the user through a user interface, such as a keyboard, mouse or stylus, in some embodiments the stage of hair loss may be assigned automatically by an image processor which classifies the stage of hair loss, by extracting from the images information or data which can be used to assign the stage of hair loss. In one embodiment the hair loss stage can be acquired from pre-existing data stored in the computer system's memory, such as from image data can retrieved from the patient's electronic records. In other embodiments, optionally, one or more images may be acquired using, for example, a digital camera (optional step 210). By way of non-limiting example, the images may be acquired using a hand held digital camera, or even a mobile telephone camera, and can be inputted through the user interface of the hair simulation system. The image data may comprise one or more images, from which data or information can be extracted pertaining to the stage of hair loss, for example the ratio of hair covered scalp to hair-less scalp, and/or the location of the hair regions.

Having assigned a current stage of hair loss using any of an appropriate technique or method, it is determined in step 240 whether the assigned stage of hair loss is above or below a threshold value (which can be determined based on a particular application or situation). One or more additional or new hairs are then simulated on a 3D model using a first approach of hair representation if the assigned hair loss is below the threshold value (step 250), and using a second approach of hair representation if the assigned hair loss is above the threshold value (step 260). For example, in certain implementations, the threshold value may be set as the Norwood stage 5 of hair loss, and if the assigned stage of hair loss is below Norwood stage 5 (e.g., stages 1-4), a first approach of hair representation (step 250) may comprise simulating projected hair. Projected hair, in the context of the current application, may comprise hair that is initially simulated as volumetric hair, but is then projected onto the surface of the 3-D model, as further described by way of example below. Using the same threshold value, if the assigned stage of hair loss is 5 or above (e.g., stages 5-7), the second approach of hair representation may comprise simulating volumetric hair (step 260). Volumetric hair, in the context of the current application will be hair that is defined in three-dimensional space, and is disposed on a 3-D image. Volumetric hair may be simulated using any appropriate approach, as known in the art. It will be apparent to those in the art that the flow chart of FIG. 2 schematically represents one embodiment of the methodology, and though only two approaches of hair representation are shown, any number of alternative approaches of hair representations may be utilized. Similarly, though the above example describes projected and volumetric hair simulations, other types of simulation may be selected. Further, one or multiple levels of thresholds may be used or selected by the user to accommodate the number and type of approaches of hair representation available, enabling an optimum system to be designed so that realistic images can be simulated. It will be apparent that depending upon the nature of the application, any number of a threshold value(s) and element simulation approaches can be utilized, based on the parameters available.

There are many ways in which volumetric or projected hair can be simulated. The following examples are to be considered representative of one of a number of possibilities. In one embodiment, each simulated additional volumetric hair 300 may comprise a plurality of hair segments 310, disposed end to end, as illustrated in FIG. 3. FIG. 3 shows a hair comprising 5 segments, though any number of segments may be utilized. The size of each segment may be fixed or variable, though it has been found that a segment sized in the region of 150 μm provides a good representation of a realistic hair. Twenty segments have been found to provide smooth results, aesthetically pleasing to the eye and providing a realistic image for the patient. The length of the plurality of segments placed end-to-end determines the overall length of the hair. In some embodiments the user may adjust the length of the individual segments, or alter the number of segments used, thus adjusting the overall length of the hair. Typically, to reduce software complexity, each segment of the plurality of segments is substantially the same length, however is will be appreciated that the length of one or more segments may vary. The angle 320 between each of the segments relative its adjacent segment is adjustable, and determines how straight or curly the hair is. To adjust the curl of the hair, the user can adjust the angle 320 between the segments. The greater the angle 320 between the segments, the more curly the hair. The lesser the angle 320 between the segments, the less curly the hair, or the hair is substantially straight. The segment angle 320 may range anywhere from 5 to 20 degrees. In addition to adjusting the angle 320 between segments, the user may additionally alter the elevation angle 330, which is the angle at which the first segment, the segment that exits from the scalp, forms with the surface of the head 340. The elevation angle 330 may comprise an angle ranging, for example, anywhere from 20 to 60 degrees.

Projected hairs 400, as illustrated in FIG. 4, may be simulated in a manner similar to that of volumetric hairs, however, it is "projected" by reducing both the elevation angle and the angle between the segments. It has been found that using "a projected hair" approach, an elevation angle is typically less than 20 degrees and a segment angle is typically less than 20 degrees.

However generated, the modeling software generates and the hair simulation system may display on the user interface, or monitor, at least one additional hair. Having selected the hair elements within which, for example, follicular unit implantation is desired, as an optional step, the additional hair simulation may be further customized. Accordingly, the present application also provides a hair simulation plan, which automatically modifies or generates simulated additional hairs or follicular units based on one or more parameters of the existing hair or follicular units. For example, as an optional step, the additional hair may be generated or modified to be substantially close to the existing hair in appearance, thereby matching the natural hair color of the hair on the 3D model (step 270). This may be achieved by extracting color information and using the extracted color information in simulating the additional hair, thereby simulating the additional hair to substantially match the color of the existing hair. Color extraction and matching techniques are known in the art, and further details are not provided herein. One such technique requires selecting an area of hair on the 3D model, and instructing the processor to execute the necessary software to extract at least two major colors from the selected area. The two major colors representing the natural color (assuming the patient has not dyed their hair) of the patient's hair.

To create a realistic image, as a further option, a blending step may also be incorporated to "smooth" the appearance of the final simulated hair (step 280). Once again, there are numerous ways in which this may be achieved. Once such way is by "softening" the edges of each simulated hair, creating a slightly fuzzy or blurred visual effect to the edges. This blending step manipulates the longitudinal edges of the simulated hairs such that the edges are modified from those as illustrated in FIG. 5a, to edges which are less distinct, as depicted in FIG. 5b. The blending step essentially blending the additional simulated hair with the existing hair of the 3-D model, giving the appearance of overlapping hairs, and hence enabling the appearance of the additional/new simulated hair to blend into the existing hair on the 3-D model.

Figure 6:
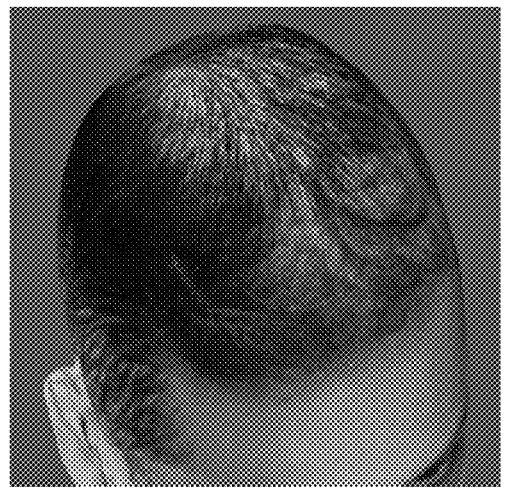
FIG. 6 illustrates an example of simulated hair on a 3D model according to the methodology of the present application.

FIG. 6 demonstrates simulation of new/additional hair according to the methodology of the present application (as described in reference to FIG. 2) on the patient of FIG. 1. Referring back to FIG. 1, the benefit of present methodology of selecting a particular approach of hair representation depending on the stage of hair loss as depicted in FIG. 6 is readily apparent. In FIG. 1, the patient had relatively early stage of hair loss, with a receding hairline and a bald spot, but the two had not merged, corresponding to a Norwood 3 stage of hair loss. As illustrated in FIG. 1, the additional hair was simulated using a prior art method which simulated volumetric hair in the area of a bald spot resulting in a non-natural, or Mohican-like look. To the contrary, in the example illustrated in FIG. 6, according to the present application, a level of hair loss was first determined (which resulted in assignment of the Norwood stage 3 as the patient's stage of hair loss), in step 240 it was determined that the assigned stage of hair loss (stage 3) was below the threshold value of 5, and according to step 250 additional or new hair was simulated on the 3D model using "the projected hair" approach (as opposed to volumetric hair as illustrated in FIG. 1). It can be seen in FIG. 6 that the simulated hair looks natural and realistic by providing a smooth transition between the pre-existing and newly simulated hair, eliminating the unnatural Mohawk hairstyle of FIG. 1.

Figure 7A:
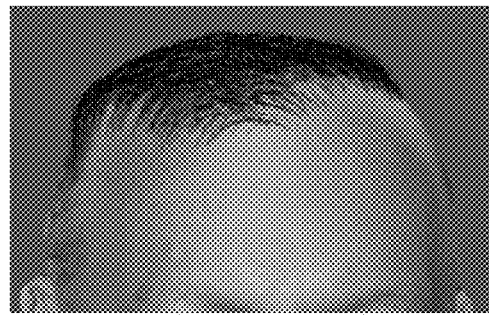
FIGS. 7a and 7b illustrate further examples of differences in representations of the simulated hair on a 3D model when accomplished using the methodology of the present application and when such methodology is not followed.
Figure 7B:
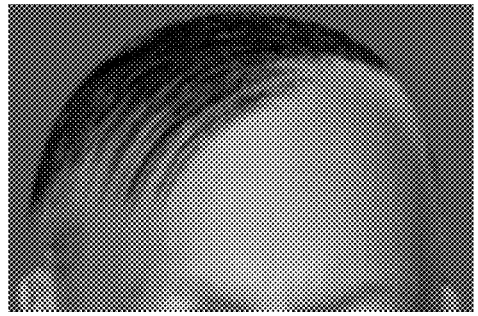

FIGS. 7a and 7b demonstrate the advantages of the current methodology of selective simulation approach based on the stage of the hair loss in reference to the example of a person having a more advanced stage of hair loss. In FIG. 7a, new hair grafts were generated using the methodology of the present application. In this particular example, the patient has little hair, with a severely receded hairline and in which a bald spot and the receding hairline meet, corresponding to a Norwood stage 6 of hair loss. Therefore, according to the methodology described by FIG. 2, in step 230 once the stage of hair loss has been assigned, in this particular example a Norwood stage 6, in step 240 it is determined that the assigned stage of hair loss (stage 6) is above the threshold value, for example, a Norwood stage 5, and according to step 260 additional hair on the 3D model were generated using a volumetric hair approach (as opposed to the projected hair approach shown in FIG. 3). It can be seen that the simulated hair in this example looks natural and realistic. FIG. 7b demonstrates that if the new hair on the patient of FIG. 7a were generated using the same projected hair approach of FIG. 6 without taking into consideration the results of the assignment of the stage of the hair loss and comparing it to the threshold according to the steps 230 and 240, then the resulting representation of FIG. 7b would be substantially inferior to the image achieved in FIG. 7a using the methodology of the present application. As illustrated in FIG. 7b, the additional hair was simulated using a method which projected the hair onto the scalp as in FIG. 6, resulting in a non-realistic image or one in which the image looks as if the patient's hair is wet or if a patient put gel into his hair and also pressed it flat against the scalp.

As demonstrated, the proposed methodology 200 is able to determine the approach to take in simulating the additional hair by selecting the appropriate algorithm to use based on the stage of hair loss. It demonstrates that a singular approach of the prior art does not allow for realistic images to be created for all stages of hair loss.

As mentioned in reference to the general methodology of FIG. 2, a 3-D image of a model of a person's head may be created (optional step 220) using a variety of available techniques and methods. In some embodiments, such a 3D image may be created in a mesh frame or template environment, or one or more 3D models may be morphed to correspond to the one or more 2-D images. Morphing uses the position/location of various features identifiable in one or more of the 2-D images to identify the position/location of the same features in the 3-D coordinate system on the 3-D model. The identifiable features may comprise one or more anatomical features such as the eyes, nose, mouth and/or ears, or one or more distinguishable features such as moles, scars, skin creases, wrinkles, freckles, birth marks, tattoos, etc. By mapping predefined features on the 3D template mesh model to the 2-D images, the model may be iteratively adjusted (by scaling, rotating and/or translating as necessary), and a realistic 3-D model obtained. In one implementation of this technique, one 3-D model is morphed based on a plurality of 2-D images. However, in this implementation, after morphing the 3-D image based on a first of the 2-D images, morphing the 3-D model again to map features found in a second of the 2-D images may degrade or affect the morphing that was initially carried out based on the first 2-D image, potentially causing features to no longer be correctly mapped. By morphing the 3-D model based on a third and subsequent 2-D image, a composite of incorrect mappings may therefore result, providing for a less than accurate finally morphed 3-D model to be created. To address this issue, in another implementation of this technique, each of the image(s), for example one (front) image, two (front and side) images, three (front, left and right side) images, or five (front, left, right, back and top) images may be morphed onto its own discrete or individual 3-D model, and the plurality of morphed 3-D models are then combined to form a final single 3-D model. The final single 3-D model formed by the plurality of morphed 3-D models provides a more accurate 3-D model that the one provided by morphing a single 3-D image to reflect the features of the multiple 2-D images. In this manner, the composite of correct mappings maintains the morphing accuracy, preserving the morphing accuracy for each of the 2-D images. The one or more images may be acquired (in accordance with well-known and available technology) from various views of a body surface of a patient, for example the patient's head (and, in particular, scalp), for which the subject transplantation procedure is being planned. It is not necessary to include images of every portion of the patient's head, since it is known to those skilled in the art that modeling software can generate a sufficiently accurate three-dimensional surface model of the head/scalp from just a few views, for example, from one (1) to six (6) views from different directions and sides, including, for example, from the top. Dependent on the purpose of the treatment plan (e.g., facial cosmetic procedure, or planning hair transplantation on the scalp), the minimum number and angles/directions of the desired views may be adjusted to achieve sufficiently accurate model. The acquired images may be processed to generate a three-dimensional model of the patient's head (e.g., scalp) using modeling software. It will be appreciated that any suitable software program may be used.

According to some embodiments, a 3-D model of the patient may be based at least in part on imaging data such as images from one or more image repositories. For example, the user may select (by moving a cursor and clicking a mouse, using the arrows on a key pad to move a selection box, or by touching with a stylus) an image or template from patient information repositories containing images from one or more patients. This may additionally allow for pre-generated hair solutions (hair transplantation treatment plans) for different baldness types to be utilized and applied to the current patient with only some minor adjustments. Referring to FIG. 8, having uploaded a series of photos (810) from various views of the patient's head, the physician may be able to select a template from a series of templates 820 which represent pre-defined stages of balding according to, for example, the Norwood scale. In addition to representations which represent each of the 7 stages, there may also be representations of the physical appearance of stages in-between the 7 stages. As illustrated, a scroll bar 830 can allow for additional templates to be selected, and all stages do not have to be viewable simultaneously by the physician. Once selected, the selected template appears in larger form on one side of the screen, as indicated 840. To aid the physician in selecting the most appropriate template, one that better matches the stage of hair loss of the patient, an image of the patient, from among the images 810, may simultaneously be viewed and displayed at 850. As can be seen in FIG. 8, the image 850 and that of the selected template 840 are not similar, and the physician would have to select another template.

FIG. 9 illustrates on a screen of a monitor a template 910 which most closely corresponds to the stage of hair loss of the patient. The modeling software generates and the hair simulation system maps the selected template to the acquired image data 920, and displays on the user interface monitor of the hair simulation system, a three-dimensional model of a patient's head/scalp 930. The final 3-D model, as illustrated in FIG. 9 will represent the patient's head/scalp, typically exhibiting characteristics of male/female baldness patterns, comprising of bald regions, follicular unit populated regions (existing hair), and/or regions which are more or less densely populated than others. The populated regions will comprise follicular units which are grouped to form regions of hair which border less populated regions, or bald regions. These regions of hair may have geometry associated with them, the geometry following that identified in the selected template. The 3-D model may also incorporate existing hair follicular units which have various parameters such as type, caliber, orientation with respect to the scalp, spacing between adjacent follicular units, height of follicles above the scalp, for example.

The physician may then add or superimpose one or more elements as dictated by any number of selected element templates 940. The selected element templates comprise one or more visual representations of hair elements into which it is desired that follicular units be implanted. These one or more hair elements or regions are generated such that they are scaled to fit on the three dimensional model of the patient's head/scalp using, for example, a best-fit algorithm, such that the elements fit into the geometric areas of already existing hair. Optionally, the one or more hair elements may be modified in shape and size to fit the three dimensional model of the patient's head/scalp. Such modification may require, for example, the modeling software to place a sizing box around each, a subset of, or all of the one or more elements. The sizing box allows the user to vary the size and shape of the one or more elements in a manner well known to those in various arts. For example, selecting and dragging any side of the box by stretching/compressing the respective side, and/or by selecting a corner and stretching/compressing the whole box. Modification may also comprise rotating and/or translating each, a subset of, or all of the one or more elements. In other embodiments modification may comprise clicking on the periphery of the hair elements, and dragging it until it corresponds to the desired size and/or shape. In an alternative embodiment, the proposed hair elements may be identified or generated by the user, for example, by freehand drawing, using for example a mouse, stylus, pen or line tool on a touch-enabled device, tablet, or other such similar device.

Based on the characteristics, information, and/or one or more physical features determined from processing the acquired images, the modeling software automatically generates or simulates, and the hair simulation system displays on the user interface monitor, a visual representation of one or more additional or new proposed hairs, or follicular units sites as shown in FIGS. 6 and 7a (step 250 or 260 of the flow chart of FIG. 2) in the one or more hair elements or regions.

Another factor that contributes to the successful outcome of a hair transplantation procedure is the natural-looking appearance of the density of hair throughout the patient's head. According to another aspect of the current application, methods (and corresponding processor systems) for generating a natural-looking interpolated density of additional hairs is provided. These methods can be executed substantially automatically, or with assistance from the user.

Figure 10:
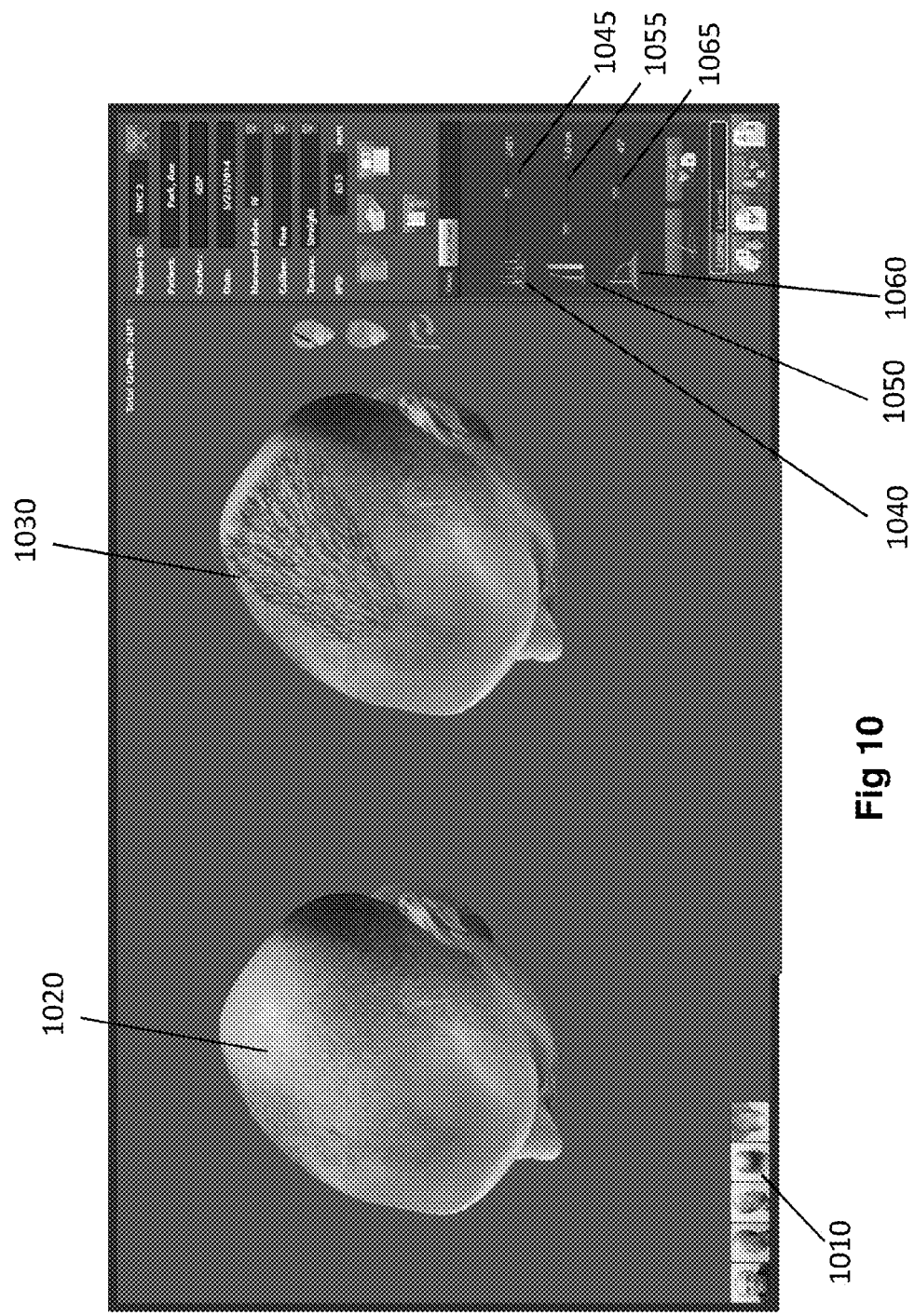
FIG. 10 illustrates another example of a user interface which may be used to implement a methodology of the present application.

FIG. 10 illustrates an embodiment of a user interface that may be utilized to aid the user in simulating a realistic image of the patient incorporating one or more of the features described above. The user interface comprises a series of 2D images 1010 from which a 3D model 1020 is generated, on one side of the display. On the other side of the display, the methodology of the current application is applied, and a 3D model generated with simulated hair. The interface illustrates by means of a density icon 1040 that the user may adjust the number of hairs simulated per unit area, a hair length icon 1050 that the user may adjust the length of the hair simulated, or a hair elevation angle icon 1060 that the user may adjust the curliness of the hair simulated. Such adjustment may be implemented using a variety of different techniques and methods. By way of example only, such adjustments may be implemented by use of an actual number input, the use of up and down arrows, or a simple sliding bar 1045, 1055 or 1065, or sliding scale mechanism, the bar allowing the user to select from a minimum value, a maximum value, and any of a range of values in-between.

Figure 11A:
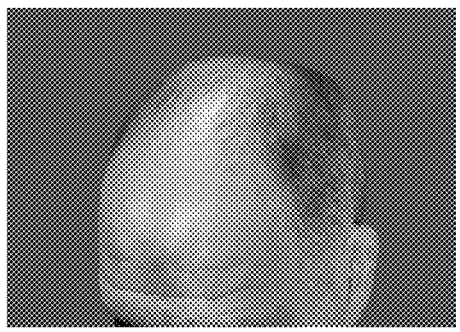
FIGS. 11a and 11b illustrate an example of "before" representations from two different views.
Figure 11B:
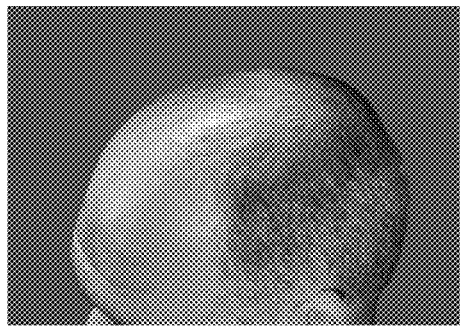
Figure 12A:
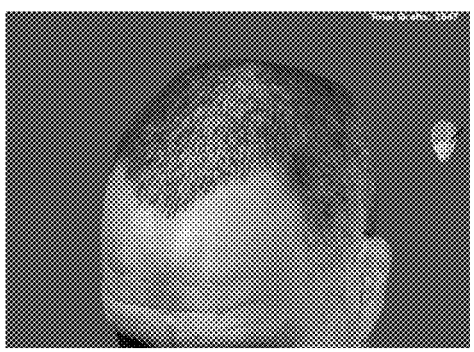
FIGS. 12a and 12b illustrate an example of "after" representations from two different views.
Figure 12B:
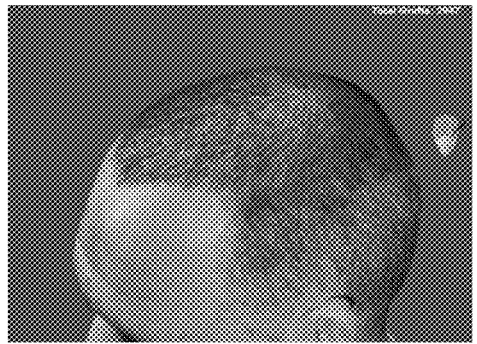

As described earlier, in yet a further embodiment the application allows the user to view the 3D model from any angle. As illustrated in FIGS. 11a and 11b, the user can see what he/she looked like before simulated hair transplantation, enabling to see how other see him/her from the side, and not just how he/she sees himself/herself in the mirror. FIGS. 12a and 12b, enable the user to visualize what the user might look like after hair transplantation, once again from any angle.

Any embodiment of the invention disclosed in this application may be implemented as a method, apparatus or system, or an article of manufacture. In accordance with various embodiments of the application, a system for simulating hairs on a 3D image, for example, for use in hair transplantation simulation on a body surface (e.g., a scalp) of a patient, may comprise a user interface, processor (e.g., software-controlled), a monitor, and at least one input device. These components may be represented in a standalone (e.g., "personal") computer system, or in a system employing a centralized server with multiple remote terminal(s). It will be appreciated that embodiments of the simulation system as described herein may be software implemented, and may be run on any computer system having the basic components (processor 1310, monitor 1320, user interface 1330), so long as such computer system is equipped with sufficient available memory and an appropriate graphic generation and display capability. The computing system may include one or more processing units 1310, one or more non-transitory storage media (which may take the form of, but is not limited to, a magnetic storage medium; optical storage medium; magneto-optical storage medium; read only memory; random access memory; erasable programmable memory; flash memory; and so on), and/or one or more input and/or output components for transmitting output to and/or receiving input from one or more other components (user interfaces 1330 such as one or more displays, touch screens, keyboards, mice, track pads, track balls, styluses, pens, printers, speakers, cameras, video cameras, and so on). The processing unit 1310 may comprise one or more modules to execute instructions stored in the storage medium in order to perform one or more computing device functions, such as one or more hair simulation methods. The system or the processing unit may additionally include an image repository, the image repository comprising templates, images of one or more patients and/or images of portions of templates or patients. The system can be configured to implement all the methodologies, processes and techniques described herein.

Various embodiments described in the specification are operational with numerous other general purpose or special purpose computing system configurations and environments. Some examples of known computing systems, configurations and/or environments that may be suitable for use with the inventions described herein include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices. Although it may be suggested that the computing system include particular components arranged in a particular configuration, it is understood that this is for the purposes of example. In various implementations, the computing system may include any number of computing system components (such as one or more busses, displays, networking components, dedicated image processors, co-processors, memories, hard drives, ports, graphics adapters, and so on) arranged in different configurations without departing from the scope of the present disclosure. For example, in one or more implementations the computing system may include image acquisition devices 1340, multiple cameras and/or video cameras arranged to capture images and/or video of the same scene. By way of another example, in various implementations the computing system may include one or more interfaces for controlling machinery such as automated and/or computer-assisted surgical machinery.

It will also be appreciated that embodiments of the application may be implemented over the internet, e.g., with a user of such system employing his or her home computer as at least a part of the user interface (monitor and input device) that interacts with a remote server or computer. In such an internet-based planning system, the software that implements and controls the user interface may reside in whole or part on the user's computer or on the remote server/computer, preferably transparent to the user. In one such embodiment, the remote server downloads one or more software modules to the user's computer for temporary or permanent use.

Embodiments of the systems of the present application may be comprised of various modules, for example, as discussed below. Each of the modules can comprise various sub-routines, procedures and macros. Each of the modules may be separately compiled and linked into a single executable program. In light of the above, the description of each of the modules is used for convenience of the description of functionality only. In one embodiment, the one or more processing units may comprise a module 1405 for extracting hair attributes from existing hair, a module 1410 for acquiring the desired hair attributes, and a module 1415 for generating additional hair. The module 1405 for extracting hair attributes for existing hair may comprise a submodule 1420 for acquiring data corresponding to color of the existing hair, a submodule 1425 for acquiring data corresponding to angle data of the existing hair, a submodule 1430 for acquiring data corresponding to density data of the existing hair, in addition to submodules for implementing the execution of steps identified in the methodology described with respect to FIG. 2 above. For example, the module 1405 may additionally include submodules 1435 and 1440 to assign hair loss and determine the type of hair representation to be utilized (volumetric or projected), respectively. The data may be acquired based on data input directly by the user through a user interface, via image processing of the image data, or any other such means. Similarly, the module 1410 for extracting desired hair attributes for the additional simulated hair may comprise a submodule 1445 for acquiring data corresponding to color of the additional simulated hair, a submodule 1450 for acquiring data corresponding to angle data of the additional simulated hair, a submodule 1455 for acquiring data corresponding to density data of the additional simulated hair, and a submodule 1460 for acquiring data corresponding to the length of the hair to be simulated. This data may be acquired based on data input directly by the user through a user interface, similar to that described above, or in some implementations may correspond to the attributes acquired from the exiting hair. Having acquired this data, the submodule 1415 generates the additional hair, using data acquired from the modules 1405 and 1410, and via a color attribute submodule 1465, angle attribute submodule 1470, density attribute submodule 1475, blending submodule 1480, and the representation submodule 1485, generates or simulates additional/new hair. Once generated, user modification may be enabled via these same modules via the user input.

Any process descriptions, elements or blocks in the flow diagrams described herein and/or depicted in the attached figures should be understood as potentially representing modules, segments, or portions of code which include one or more executable instructions for implementing specific logical functions or elements in the process. Further, the functions described in one or more examples may be implemented in hardware, software, firmware, or any combination of the above. If implemented in software, the functions may be transmitted or stored on as one or more instructions or code on a computer-readable medium, these instructions may be executed by a hardware-based processing unit, such as one or more processors, including general purpose microprocessors, application specific integrated circuits, field programmable logic arrays, or other logic circuitry.

The foregoing illustrated and described embodiments of the application are susceptible to various modifications and alternative forms, and it should be understood that the applications as generally disclosed herein, as well as the specific embodiments described herein, are not limited to the particular forms or methods disclosed, and that many other embodiments are possible within the spirit and the scope of the present applications. Moreover, although individual features of one embodiment may be discussed herein or shown in the drawings of the one embodiment and not in other embodiments, it should be apparent that individual features of one embodiment may be combined with one or more features of another embodiment or features from a plurality of embodiments. By way of non-limiting example, it will be appreciated by those skilled in the art that particular features or characteristics described in reference to one figure or embodiment may be combined as suitable with features or characteristics described in another figure or embodiment. Applicant regards the subject matter of the application to include all novel and nonobvious combinations and sub-combinations of the various steps, elements, features, functions, and/or properties disclosed herein. Furthermore, the methodologies described can be applied to any treatment, and is not limited to hair transplantation.

In the Detailed Description, reference is made to the accompanying drawings that show by way of illustration some examples of embodiments in which the invention may be practiced. In this regard, directional terminology, such as "right", "left", "front", "side", and "top", etc., are used with reference to the orientation of the Figure(s) being described. Because components or embodiments of the present invention can be positioned or operated in a number of different orientations, the directional terminology is used for purposes of illustration and is in no way limiting. It is also to be understood that other embodiments may be utilized and structural or logical changes may be made without departing from the scope of the present invention.

It will be further appreciated by those skilled in the art that the application is not limited to the use of a particular system, and that automated (including robotic), semi-automated, and manual systems and apparatus may be used for positioning and actuating the respective removal tools and other devices and components disclosed herein.

While the application has been described in its preferred embodiments, it is to be understood that the words which have been used are words of description and not of limitation. Therefore, changes may be made within the appended claims without departing from the true scope of the application.

What is claimed is:

1. A method of simulating hair on a 3D model of a head, the method comprising:
   assigning a stage of hair loss to a 3D model of a head comprising hair; and
   simulating one or more additional hair on the 3D model based on the assigned stage of hair loss,
   wherein, if the assigned stage of hair loss is below a threshold value, the one or more additional hair is simulated using a first approach of hair representation, and if the assigned stage of hair loss is at or above the threshold value, the one or more additional hair is simulated using a second approach of hair representation.

2. The method of claim 1, wherein the first approach comprises simulating a projected hair and the second approach comprises simulating a volumetric hair.

3. The method of claim 2, wherein simulating a projected hair comprises generating a volumetric hair and projecting and blending said volumetric hair with the 3D model.

4. The method of claim 1, further comprising matching the simulated one or more additional hair with a natural hair color of the 3D model.

5. The method of claim 4, wherein color matching comprises selecting an area with the hair on the 3D model and extracting at least two major colors from the selected area.

6. The method of claim 1, wherein assigning comprises receiving input from a user through a user interface or automatically assigning using an image processor.

7. A method of simulating hair on a 3D model, the method comprising:
   using one or more images of a person's head comprising existing hair to create a 3D model of the person's head;
   determining from the one or more images or from the simulated 3D model a corresponding stage of hair loss; and
   simulating one or more additional hair on the 3D model based on the determined stage of hair loss, wherein the additional hair is depicted by a first representation if the stage of hair loss is below a threshold value, and the additional hair is depicted by a second representation if the stage of hair loss is at or above the threshold value.

8. The method of claim 7, wherein one or more images comprises at least two images.

9. The method of claim 7, wherein determination of the corresponding stage of hair loss comprises manually selecting from two or more stages of hair loss available.

10. The method of claim 7, wherein the stage of hair loss is based on existence of a receding hair line, a bald spot and its size, or both, and/or whether a receding hair line and a bald spot meet.

11. The method of claim 7, wherein the stage of hair loss is determined using the Norwood scale of hair loss or Ludwig scale of hair loss.

12. The method of claim 11, wherein the threshold value is Norwood scale 5.

13. The method of claim 11, wherein the first representation comprises a projection of a volumetric simulated hair on the 3D model, and the second representation comprises simulating hair using a volumetric approach.

14. The method of claim 13, wherein projecting the volumetric simulated hair comprises projecting it such that an angle between a body surface and a first segment of the hair is less than a predetermined angle.

15. The method of claim 14, wherein the predetermined angle is preferably twenty degrees or less.

16. The method of claim 7, wherein the one of the first or the second representation comprises volumetric hair simulation.

17. The method of claim 7, wherein simulating one or more additional hair comprises simulating a hair in the form of a plurality of hair segments, each segment placed end to end and at an angle to an adjacent segment.

18. The method of claim 17, wherein the angles between some of all of the adjacent segments are variable and a greater angle between the adjacent segments represents a greater curl of the simulated additional hair, and a lesser angle between the adjacent segments represents a straighter additional simulated hair.

19. The method of claim 17, wherein the number of hair segments is fixed and/or a length of each hair segment is fixed.

20. The method of claim 17, wherein the number of hair segments can be varied to achieve a predetermined length of the additional simulated hair.

21. The method of claim 17, wherein a length of each of the plurality of segments is combined to form a length of one additional hair.

22. The method of claim 7, further comprising blending the additional simulated hairs with the existing hair on the 3D model, wherein blending comprises manipulation of longitudinal edges of the additional hair such that the edges are less distinct.

23. The method of claim 22, further comprising adjusting a level of blending by means of a sliding scale mechanism.

24. The method of claim 7, further comprising adjusting a density of the additional hair.

25. The method of claim 7, wherein determination of the stage of hair loss comprises extracting information from the images based on a percentage of hair relative to a percentage of scalp.

26. The method of claim 7, wherein the 3D model is created by combining a plurality of morphed 3-D models.

27. The method of claim 26, wherein each of the plurality of morphed 3-D models comprises a 3-D model which was morphed by mapping predefined features from one or more 2-D image.

28. A system for simulating hair on a 3D model of a head, the system comprising:
- a user interface including a user input device;
- at least one non-transitory storage medium storing instructions, and
- one or more modules for executing operations on image data, the one or more modules comprising instructions for:
  - assigning a stage of hair loss to a 3D model; and
  - simulating one or more additional hairs on the 3D model based on the assigned stage of hair loss,
  - wherein, if the assigned stage of hair loss is below a threshold value, the one or more additional hair is simulated using a first approach of hair representation, and if the assigned stage of hair loss is at or above the threshold value, the one or more additional hair is simulated using a second approach of hair representation.

29. The system of claim 28, wherein the one or more modules further comprises instructions for executing a color match, blending or both.

* * * * *